(12) United States Patent
Reese

(10) Patent No.: US 10,906,252 B2
(45) Date of Patent: Feb. 2, 2021

(54) METHOD FOR THE PRODUCTION OF AN FMV HYBRID COMPONENT, AND FMV HYBRID COMPONENT

(71) Applicant: Daimler AG, Stuttgart (DE)

(72) Inventor: Eckhard Reese, Apensen (DE)

(73) Assignee: Daimler AG, Stuttgart (DE)

( * ) Notice: Subject to any disclaimer, the term of this patent is extended or adjusted under 35 U.S.C. 154(b) by 394 days.

(21) Appl. No.: 15/759,022

(22) PCT Filed: Jul. 28, 2016

(86) PCT No.: PCT/EP2016/001312
§ 371 (c)(1),
(2) Date: Mar. 9, 2018

(87) PCT Pub. No.: WO2017/041869
PCT Pub. Date: Mar. 16, 2017

(65) Prior Publication Data
US 2020/0238635 A1    Jul. 30, 2020

(30) Foreign Application Priority Data

Sep. 10, 2015 (DE) .................. 10 2015 011 846

(51) Int. Cl.
*H05B 6/10* (2006.01)
*H05B 6/36* (2006.01)
(Continued)

(52) U.S. Cl.
CPC .......... *B29C 70/222* (2013.01); *B29C 70/865* (2013.01); *B29C 70/025* (2013.01);
(Continued)

(58) Field of Classification Search
CPC ......... B29C 70/32; B29C 45/14; B29C 47/02; B29C 53/02; B29C 70/16; B29C 70/44;
(Continued)

(56) References Cited

U.S. PATENT DOCUMENTS

| | | | |
|---|---|---|---|
| 5,137,766 | A | 8/1992 | Mazanek et al. |
| 6,605,171 | B1 | 8/2003 | Debalme et al. |

(Continued)

FOREIGN PATENT DOCUMENTS

| | | |
|---|---|---|
| CN | 1324295 A | 11/2001 |
| CN | 1564744 A | 1/2005 |

(Continued)

OTHER PUBLICATIONS

DE 102012018804A1 Translation, Method for manufacturing structural component from fiber-reinforced plastic for motor vehicle, Mar. 7, 2014, W (Year: 2014).*

Chinese Office Action issued in Chinese counterpart application No. 201680052049.9 dated May 17, 2019, with partial English translation (Ten (10) pages).

German-language German Office Action issued in German counterpart application No. 10 2015 011 846.3 dated Oct. 22, 2019 (Five (5) pages).

(Continued)

*Primary Examiner* — Quang T Van
(74) *Attorney, Agent, or Firm* — Crowell & Moring LLP

(57) ABSTRACT

A method for the production of an FMV hybrid component includes braiding a dry hybrid fibre thread onto a core element, where a hybrid fibre braid is formed, and obtaining a fibre core composite. The method further includes reshaping the fibre core composite and impregnating and consolidating the hybrid fibre braid on the core element.

9 Claims, 2 Drawing Sheets

(51) Int. Cl.
*B05C 3/10* (2006.01)
*B29C 70/22* (2006.01)
*B29C 70/86* (2006.01)
*B29C 70/02* (2006.01)
*B29C 70/52* (2006.01)
*B29C 35/08* (2006.01)
*B29K 101/12* (2006.01)
*B29L 31/30* (2006.01)

(52) U.S. Cl.
CPC ....... *B29C 70/52* (2013.01); *B29C 2035/0811* (2013.01); *B29K 2101/12* (2013.01); *B29L 2031/3044* (2013.01)

(58) Field of Classification Search
CPC ......... B29C 70/50; B29C 70/54; B29C 70/52; B32B 27/08; B32B 37/12; B32B 27/40; B32B 27/38; B32B 27/36; B32B 27/306; B32B 5/18; B32B 38/1866; H01L 41/331
USPC ....... 219/633, 634, 635, 645, 646, 601, 609, 219/615; 118/69; 428/389, 375; 427/398.1
See application file for complete search history.

(56) References Cited

U.S. PATENT DOCUMENTS

| | | | |
|---|---|---|---|
| 8,945,327 B2* | 2/2015 | Stamp | B29C 70/028 |
| | | | 156/213 |
| 2009/0311506 A1 | 12/2009 | Herbeck et al. | |
| 2015/0266276 A1* | 9/2015 | Vissing | B32B 27/38 |
| | | | 428/319.3 |

FOREIGN PATENT DOCUMENTS

| | | |
|---|---|---|
| CN | 101765626 A | 6/2010 |
| DE | 38 10 598 A1 | 10/1989 |
| DE | 10 2010 052 078 A1 | 5/2012 |
| DE | 10 2012 018 804 A1 | 3/2014 |
| WO | WO 03/063548 A2 | 7/2003 |

OTHER PUBLICATIONS

PCT/EP2016/001312, International Search Report dated Jan. 2, 2017 (Four (4) pages).

* cited by examiner

METHOD FOR THE PRODUCTION OF AN FMV HYBRID COMPONENT, AND FMV HYBRID COMPONENT

BACKGROUND AND SUMMARY OF THE INVENTION

The invention relates to a method for the production of an FMV hybrid component, and an FMV hybrid component.

A method for the production of a fibre matrix composite component (FMV component) is known from the published German patent application DE 10 2012 018 804 A1, wherein a moulded hose is braided around or wrapped by an FMV material, wherein the moulded hose is preshaped after heating and is supplied into a heated pultrusion mould. Thereafter, the FMV material that has solidified in the meantime is reshaped by means of rotary draw bending under high internal pressure. Hereafter, the moulded hose together with the FMV material is overmoulded by plastic. Finally, the moulded hose is removed from the finished component. As a result of the repeated melting of the thermoplastic part of the FMV component, this decreases in quality, wherein its mechanical properties, in particular, deteriorate. Furthermore, high degrees of reshaping cannot be achieved. The removal of the moulded hose is problematic since damage to the moulded hose and/or the FMV material can hardly be avoided in the event of more extensive reshaping because of friction between the FMV material and the moulded hose.

The object of the invention is to create a method for the production of an FMV hybrid component, and an FMV hybrid component, wherein the disadvantages referred to do not arise.

The object is solved, in particular, by a method for the production of an FMV hybrid component being created which has the following steps. A dry hybrid fibre thread is braided onto a lost core element, such that a hybrid fibre braid is formed on the core element, and a fibre core composite is obtained. The fibre core composite, which has the core element and the hybrid fibre braid, is reshaped, and the hybrid fibre braid is impregnated and consolidated on the core element. In this manner, an FMV hybrid component is obtained which—now in a one-piece shape—has, on the one hand, the consolidated hybrid fibre braid and, on the other hand, the core element. The core element thus remains in the finished FMV hybrid component and represents a lost core element insofar as it is not removed again from the FMV hybrid component and is not supplied again to the production process. Rather, it forms an integral constituent of the FMV hybrid component. As a result of a dry hybrid fibre thread being braided onto the core element, particularly high degrees of reshaping are possible, since thus not only a fibre elongation can be achieved but also a structural elongation by shifting the braid structure. Here, bending angles of less than 150° are readily achievable. Individual fibres of the hybrid fibre thread are elongated less in this state and thus are relieved. Thus, even bending angles of 90° or less can be preshaped with low bending radii. In contrast, semi-finished products that have already been completely impregnated and/or consolidated can only be reshaped under great fibre elongation and/or fibre compression, such that—if damage or predamage to such a semi-finished product is to be avoided, considerably smaller degrees of reshaping, i.e., in particular only considerably greater bending angles, can be achieved.

Braiding the hybrid fibre thread preferably takes place by means of braid pultrusion. This represents a manner of braiding a dry hybrid fibre thread onto the lost core element which is just as safe as it is simple and cost-effective.

The term "dry" in the context of the dry hybrid fibre thread is, in particular, to be understood such that this is not yet impregnated and/or consolidated. Rather, the hybrid fibre thread has a matrix material in a form that is not yet melted.

The term "hybrid fibre thread" is understood, in particular, to mean a thread which has both a fibre material and a matrix material. According to one design, here it is possible that the hybrid fibre thread, on the one hand, has fibres of a fibre material, namely reinforcing fibres, and, on the other hand, has matrix fibres made of a matrix material, wherein the reinforcing fibres and the matrix fibres are preferably present one next to the other in a fibre bundle or roving of the hybrid fibre thread.

Alternatively or additionally, it is possible that the hybrid fibre thread has coated reinforcing fibres which are coated or surrounded by matrix material.

Glass fibres, carbon fibres, aramide fibres, PBO fibres, polyethylene fibres, natural fibres, basalt fibres, quartz fibres, aluminium oxide fibres, silicon carbide fibres, metal fibres, ceramic fibres, other suitable fibres, and/or mixed forms of different fibres are used as the reinforcing fibres.

Thermosetting plastics, thermoplastics, elastomers, fillers, saturated or unsaturated polyester resins, epoxy resins, vinylester resins, other suitable materials, in particular plastics, or mixed forms of such materials are used as the matrix material. It is particularly preferred that a thermoplastic is used as the matrix material for the hybrid fibre thread, particularly preferably polyamide or PPA. Here, thermoplastics are, on the one hand, particularly easy to process and cost-efficient, and, on the other hand, easy to recycle.

A fibre structure, in particular, is understood to mean a fibre-matrix composite which is embedded in a matrix. Here, the fibre structure is surrounded by the matrix which is bound to the fibre structure by adhesive or cohesive forces. A fibre-matrix composite (FMV) thus comprises, in particular, an impregnated and consolidated fibre structure.

Reshaping the fibre core composite is preferably carried out by means of a multi-axis robot, in particular by means of a multi-axis robot that has a plurality of micro multi-axis robots—preferably arranged on a carrier plate—having gripping devices. These can receive and fix the fibre core composite along its longitudinal axis. Furthermore, it is possible with the aid of the multi-axis robot to at the same time reshape the fibre core composite at all provided bending points, and thus to give the fibre core composite its eventual course in one single step. To do so, two gripping devices, in particular of micro multi-axis robots, are preferably provided at each bending point. With simultaneous reshaping, a large part of the space that is otherwise necessary for the reshaping process can be advantageously saved. Furthermore, the process time is considerably reduced. The gripping devices of the micro multi-axis robot can also be used as handling devices at the same time in further method steps.

According to a development of the invention, it is provided that a core tube is used as the core element, the core tube preferably having at least one plastic or consists of a plastic. In this manner, the core element can be formed to be able to be produced in an easy and simple manner, furthermore to be able to be readily flexibly reshaped in a simple manner.

A core tube that is hollow on the inside is to be understood to mean a core element which can have a multitude of different—in particular any—cross-sectional shapes. For example, the core element can be formed as a rectangular tube, as a square tube, as a round tube, in particular as a circular or oval tube, or in a different suitable manner. A circular formation of the core tube is particularly preferred because this can thus receive a supporting internal pressure for the reshaping in a particularly suitable manner.

Alternatively or additionally, a core element is preferably used which is formed as a core tube, wherein it is used when reshaping the fibre core composite under supporting internal pressure. Hereby, the reshaping of the fibre core composite can be carried out without the core element—which is particularly pliable during reshaping—regionally coinciding and/or undergoing too great a deformation in terms of its cross-sectional course.

According to a development of the invention, it is provided that at least the hybrid fibre thread and/or at least the core element has/have magnetically effective particles, wherein the fibre core composite is inductively heated for the reshaping and/or for the impregnation and consolidation. By means of the magnetically effective particles, an inductive heating of the fibre core composite is possible in a very simple, quick and cost-effective manner, wherein impairing the quality of the material can be avoided. Here, the inductive heating can be provided, on the one hand, for the reshaping and, on the other hand, alternatively or additionally, for impregnation and consolidation.

Electrically conductive particles are preferably used as magnetically effective particles. Particularly preferably, nanoparticles, in particular ferritic nanoparticles, are used as magnetically effective particles. This allows for a particularly efficient inductive reshaping because they no longer have any Weiss regions, namely magnetic domains that can be separated from one another, such that they have particularly good and distinctive magnetic properties.

Particularly preferably, it is provided that both the hybrid fibre thread and the core element have such magnetically effective particles.

According to a development of the invention, it is provided that stamps are introduced on the end side in the core tube, the stamps a) serving as part of a sealing device for applying the supporting internal pressure, b) being used in the core tube as a reshaping die when reshaping, and/or c) remaining in the FMV component as lost stamps, in particular as bushing, particularly preferably as UD-FMV bushing (unidirectional fibre-matrix-composite bushing).

The internal pressure can preferably be applied by means of a sealing device that has, on the one hand, the stamps which are inserted into the core tube on the end side and, on the other hand, a sealing unit—per end of the core tube. Here, each sealing unit interacts with a stamp in order to seal the core tube and construct the supporting internal pressure. Preferably, each sealing unit has at least one connection via which a fluid applying the supporting internal pressure can be introduced into an inside of the core tube. Particularly preferably, each sealing device has two connections for two pressure lines in which the fluid is present under different pressure. Here, with the aid of the two pressure lines, at least two different pressures can be formed inside the core tube in different stages of the method. A return valve is arranged in the at least one connection, such that a supporting pressure prevailing inside the core tube can be maintained when the sealing unit is removed from a pressure line.

Additionally or alternatively, the stamps preferably serve as a reshaping die, wherein they give the ends of the core tube, in particular, a certain shape that is predetermined by the geometry of the stamps. This allows for a functional integration with regards to the stamps, wherein additional components can be avoided.

Additionally or alternatively, the lost stamps preferably remain in the FMV component and serve a further function there, particularly preferably as bushing, wherein they are preferably formed as unidirectional fibre-matrix composite bushing (UD-FMV bushing). Here, it is possible, for example, to introduce inserts into the stamps in order to connect the existing FMV component to other components, for example a motor vehicle shell body. Such inserts can be, for example, threaded inserts or other inserts provided for fastening. The stamps themselves can also be formed as such connection elements by them having a corresponding thread, for example.

Preferably, the stamps fulfil a number of functions, such that there is a high functional integration within the method, which makes it simple and quick to carry out and cost-effective.

According to a development of the invention, it is provided that the fibre core composite is manufactured continuously in an endless process. This is readily possible by means of braid pultrusion, wherein, in a particularly preferred embodiment, it is additionally provided that the core tube is extruded in the manufacturing direction before the braid pultrusion device and thus—in particular in an endless process—is produced such that it is constantly renewed for the method. The extrusion system can be provided integrated in the braid pultrusion system in an advantageous manner.

Individual FMV hybrid semi-finished products are preferably cut from the endless fibre core composite formed as part of the method, whereby individual FMV hybrid semi-finished products can be obtained in a very simple manner for the further method steps, in particular for the reshaping and the subsequent impregnation and consolidation. These FMV semi-finished products are then also initially present as fibre core composites that are reshaped and impregnated and consolidated to form the FMV hybrid component.

Cutting is preferably carried out by means of at least one laser beam, in particular by a cutting laser. This has the advantage that ends of the resulting FMV hybrid semi-finished products are melted by the laser beam and are fixedly connected on the end sides after cooling, in particular surrounded by matrix material. As a result, individual fibres or fibre bundles of reinforcing fibres protruding beyond the FMV hybrid semi-finished product or the fibre core composite on the end sides, and thus being able to damage either a tool used as part of the method, or even causing damage to the FMV hybrid component to be formed can be avoided.

According to a development of the invention, it is provided that welding points are placed along a longitudinal axis of the fibre core composite. Particularly advantageously, this is still carried out on the endless fibre core composite before the cutting. Alternatively or additionally, it is also possible to provide welding points on the FMV hybrid semi-finished product that has already been cut. Particularly preferably, the welding points are placed by means of at least one laser beam, wherein the cutting laser used for cutting can also be used in an advantageous manner for placing the welding points. However, it is alternatively also possible that at least one separate welding laser is used for placing the welding points.

The welding points have the advantage that they can fix the hybrid fibre braid braided on the core element onto the core element in terms of position, such that, furthermore, high degrees of reshaping during reshaping are still achievable because the hybrid fibre braid remains flexible, yet on the other hand, the hybrid fibre braid cannot be shifted to a great extent and, in particular, globally relative to the core element. Here the welding points serve, in particular, as transport securing of the hybrid fibre braid on the core tube, such that the hybrid fibre braid cannot shift during transportation.

According to a development of the invention, it is provided that a core tube is used that has a plurality of layers. Here, a multilayer core tube also fulfils a plurality of different functions in an advantageous manner.

Preferably, the core tube has an outer layer that has a plastic or consists of a plastic that is chemically at least similar to a matrix plastic. Particularly preferably, the outer layer has a plastic that is the same as the matrix plastic of the hybrid fibre thread or is identical to this. In this way, a substance can be obtained in the production process by welding the core element to the hybrid fibre thread, such that the thread is held unshakeably on the core element. Furthermore, an inner connection between the matrix material of the hybrid fibre braid, on the one hand, and the plastic of the outer layer, on the other hand, emerges during impregnation and consolidation, such that an integral and, in particular, one-piece FMV hybrid component is formed from the hybrid fibre braid and the core element.

Alternatively or additionally, the core tube preferably has an inner layer that has a plastic that has at least one property that is selected from a group consisting of: a pressure-tight property, in particular a high pressure-tight property, a fluid-tight property, and a higher glass transition temperature and/or a higher melting temperature than the matrix plastic of the hybrid fibre thread.

Pressure-tight property is understood here to mean, in particular, a property that enables the inner layer to receive the supporting internal pressure which is applied as part of the method, without thus being damaged or weakened. A fluid-tight property is understood, in particular, to mean a property that enables the inner layer to receive the fluid which is introduced for applying the supporting inner pressure into the inside of the core element, without thus being impeded or damaged, and, in particular, without an outward leaking of the fluid taking place.

The supporting inner pressure preferably serves as bracing against the braid pressure when braiding the hybrid fibre thread, for support when reshaping, and/or later for support against the consolidation pressure.

A higher glass transition temperature and/or a higher melting temperature of the plastic for the inner layer in comparison to the matrix plastic of the hybrid fibre thread enables a process-stable formation of the core element, also during impregnation and consolidation.

PA or PPA, for example, can be used as the plastic for the outer layer. PA6, PPA or PEEK, for example, can be used as the plastic for the inner layer.

The inner layer preferably has a greater strength or thickness than the outer layer. It is particularly preferred that the inner layer is formed to be considerably stronger or thicker than the outer layer.

It is possible that the core tube only has the outer layer and the inner layer, i.e. is formed of two layers. The term outer layer moreover means, in particular, that the outer layer is provided radially outwards on the core tube, wherein it forms, in particular, a radially outermost layer of the core tube, wherein the hybrid fibre thread is braided onto the outer layer of the core tube.

The inner layer is arranged radially inwards in the core tube relative to the outer layer. Here, in one embodiment, it can be the innermost layer of the core tube.

Alternatively or additionally, it is possible that the core tube has an innermost layer that has a plastic that has at least one property that is selected from the group consisting of: a fluid-tight property, a medium-resistant property, a slideable property, and a temperature-resistant property.

It is possible that the core tube only has two layers, namely the outer layer and the innermost layer. Here, the innermost layer is arranged radially within the outer layer.

Yet an exemplary embodiment, in particular, is also possible in which the core tube has at least three, preferably exactly three layers, namely the outer layer radially outwards, the innermost layer radially inwards, and between the outer layer and the innermost layer—seen in the radial direction—the inner layer.

A medium-resistant property, here, is to be understood, in particular, to mean a property that allows the innermost layer to be resistant to chemicals, in particular to the fluid applying the supporting internal pressure, and/or to chemicals introduced in a later use or in a further processing step of the FMV component.

A slideable property preferably means that the plastic that has the innermost layer has a better sliding property than a plastic that is used for the outer layer and/or for the inner layer.

A temperature resistant property means, in particular, that the plastic of the innermost layer is temperature resistant up to a higher temperature than a plastic that is used for the outer layer and/or for the inner layer.

PPA. PEEK, PA6.6, beam-crosslinked PA or a short glass fibre reinforced PA, in particular having short glass fibres amounting to about 20%, is/are preferred as the plastic for the innermost layer. A foamed property is also possible for the innermost layer, the innermost layer thus being preferably formed as a foamed layer.

Particularly preferably, each of the layers of the core tube has magnetically effective particles, such that the whole core tube with all its layers can be inductively warmed and softened in a mouldable manner.

According to a development of the invention, it is provided that both the hybrid fibre thread and the core element have magnetically effective particles, wherein a lower concentration of magnetically effective particles is used for the hybrid fibre thread than for the core element. It is then possible in an advantageous manner to firstly—for the purposes of reshaping—rapidly heat the core element to a softening temperature, because of its higher concentration of magnetically effective particles, with a preferably correspondingly adjusted magnetic field strength of an inductive magnetic field, without here already warming the hybrid fibre thread to such an extent that it results in an impregnation or in damage to the matrix material because of melting and re-hardening.

Alternatively or additionally, it is preferably provided that for the hybrid fibre thread, magnetically effective particles having a higher Curie temperature are used than for the core element. The Curie temperature, here, is, in particular, the temperature at which the magnetically effective particles undergo a phase transition and lose their magnetic effectiveness. It is then possible, in an advantageous manner—in particular for the purpose of impregnation and consolidation—to inductively heat specifically the hybrid fibre braid on the core element, wherein the Curie temperature of the magnetically effective particles of the core element is already exceeded, these are thus no longer magnetically effective, and, correspondingly, the core element itself is no longer actively heated.

It is particularly preferred that the hybrid fibre thread has both a lower concentration of magnetically effective particles than the core element and magnetically effective particles having a higher Curie temperature than the core element. In this combination, in each case, a selective heating of the hybrid fibre braid, on the one hand, and the core element, on the other hand, is possible in different method steps. Because of the lower concentration of magnetically effective particles in the hybrid fibre thread, when heating for the purpose of reshaping, the core element is heated considerably more quickly than the hybrid fibre braid, wherein reshaping can be carried out before the thermoplastic part of the hybrid fibre thread can melt. Subsequently, the impregnation of the braid can then take place wherein, preferably, a higher output is applied to the inductor which now melts the thermoplastic part of the hybrid fibre braid and impregnates the reinforcement fibres. Here, the Curie temperature of the core element is already exceeded, such that this is not heated up any further. A multiple heating, in particular melting, and re-hardening of different regions of the emerging FMV hybrid component is thus very efficiently avoided, such that the accompanying disadvantages in terms of the substance quality are also avoided.

According to a development of the invention, it is provided that the FMV hybrid component is provided in an injection moulding tool having at least one overmould. Here, an overmould is understood, in particular, to mean a geometry applied by way of injection moulding, in particular a function element applied by overmoulding. An overmould here is also to be understood as an extrusion coating, wherein an extrusion coating refers, in particular, to a complete extrusion coating of a region of the FMV hybrid component, while an overmould does not necessarily take place completely.

In an advantageous manner, a metal powder injection moulding process and/or a plastic injection moulding process can be used as the injection moulding process.

In particular by overmoulding a plastic, in particular a thermoplastic, an integrally bonded connection between the overmoulded plastic and the matrix material of the FMV hybrid components is achieved, which is advantageous for the stability of the finished component. Here, a plastic is preferably used that is similar to the matrix plastic of the FMV hybrid component, or the same as it, or identical to it.

Overall, by overmoulding the plastic, a plastic-plastic hybrid component is finally obtained, which, on the one hand, has the FMV hybrid component and, on the other hand, additionally has a plastic extrusion coating.

In general, hybrid component is understood, in particularly, to mean a component that is formed from several components that are different if necessary, here in particular from the hybrid fibre braid, on the one hand, and the core element, on the other hand, as well as, optionally, at least one additional overmould.

Alternatively or additionally, it is preferably provided that the FMV hybrid component is connected to at least one flat FMV semi-finished product. Such a flat FMV hybrid semi-finished product can, in particular, be an organic sheet or a board made of an FMV material and preferably cut to completion in a different manner. In this way, further functions, in particular connection flanges for further components, can be provided on the hybrid component.

Preferably, the flat FMV semi-finished product is introduced into the injection moulding tool in which the FMV hybrid component is also introduced for applying the at least one overmould. Here, the injection moulding tool can serve to at the same time reshape and connect the FMV semi-finished product to the FMV hybrid component, in particular supported by the closing pressure of the injection moulding tool and/or by the spray pressure when overmoulding or extrusion coating. Here, it is possible, in particular, that the flat FMV semi-finished product is also at least regionally extrusion coated in order to obtain an additional reinforced connection to the FMV hybrid component. In this way, a very stable plastic-plastic hybrid component overall can be obtained.

Because of the additional flat FMV semi-finished product, the component emerging in such a way is then formed, in particular, as an FMV-FMV component.

Yet it is also possible that the overmoulded plastic is fibre-reinforced, in particular short fibre-reinforced, in particular short glass fibre-reinforced. In this case, an FMV-FMV hybrid component is also obviously obtained.

The object is finally also solved by an FMV hybrid component being produced that is manufactured in a method according to one of the embodiments described above. Thus, the same advantages are achieved in connection with the FMV hybrid component which have already been described in connection with the method.

Particularly preferably, it is provided that the FMV hybrid component is formed as a front-end carrier, in particular for a motor vehicle. Here, in a particular manner, the advantages explained above can be realised; at the same time, lightweight construction for the motor vehicle can be operated which helps to save operating costs and fuel consumption, in particular.

The at least one flat FMV semi-finished product is used here, in particular, in order to form a Z-brace for the front-end carrier. In its finished state, the front-end carrier thus has a Z-brace which is formed by at least one flat FMV semi-finished product being formed which is connected to the FMV hybrid component—preferably in the injection moulding tool.

Correspondingly, an embodiment of the method explained above is preferred in which it is provided that a front-end carrier, in particular for a motor vehicle, is manufactured as the FMV hybrid component.

Below, a specific embodiment of the method is explained in more detail:

A front-end carrier that is produced with this embodiment of the method consists of an FVK tube (FVK—fibre-reinforced plastic) which has several bending points and different cross-sections. An organic sheet is used for the Z-brace that is placed halfway around the tube and is injection moulded with plastic elements. When producing this front-end from a fibre plastic composite, the FVK tube has to be filled with an internal pressure during production. If this FVK tube is not yet consolidated, the pressure medium would escape through holes in the braid. A core tube, around which the tube is braided, can prevent gas escaping. In an endless process, a hybrid roving made of plastic fibres (e.g. out of PA, PPA, . . . ) and reinforcement fibres (e.g., glass, carbon, aramide fibres) is braided onto the tube. A laser serves as the trimming device. This has the advantage that the ends of the small FVK tubes are melted and are rigidly connected there after cooling. Thus, the braided ends cannot fray during transportation in further handling devices. Similarly, depending on the length, welding points should be distributed on the small tube, since the braid can be shifted on the core during transportation. The braid (UD braid) is applied to a core tube which receives the braid pressure. The core tube has a multi-layer construction, wherein each layer fulfils its own function. The uppermost layer consists of a material that is similar to the matrix material of the FVK. This is welded to the FVK in the later process. Underneath, there is a considerably thicker layer made of a high-performance plastic. This receives the braid and consolidation pressure. Similarly, this substance must also have a high glass transition temperature since it also must not melt at high temperatures. The innermost layer is a functional surface that can fulfil different tasks, such as high gas impermeability, high media resistance, specific slide properties or yet more temperature resistance, for example. Each of these steps must be fulfilled by ferritic nanoparticles. These serve to heat the core tube later in the process. Since this is stiff in the cold state, it becomes flexurally soft by heating and can be reshaped more easily.

The Curie point (Curie temperature) of the nanoparticles in the hybrid braid must be set in such a way that the FVK matrix is optimally melted in the impregnating station, yet cannot be thermally destroyed. The nanoparticles in the core tube have to have a Curie point that does not melt the plastic, however makes it flexibly reshape. Timing the process is optimized by means of the particle concentration. The higher the concentration in the plastic is, the quicker these are heated. The concentration in the hybrid thread is considerably lower than in the core tube. As a result, the core tube is heated more quickly when pre-warming the plastic. If the required temperature is reached, the generator is turned off. The temperature in the braid still lies below the temperature of the core tube as a result of the slower heating. If the component is now heated in the impregnation and reshaping tool, the power is considerably increased in comparison to the first heating. Thus, the braid can be warmed more quickly and melts. However, since the Curie point of the core tube is already achieved, this does not warm up any further.

In the example of an FVK front-end, higher degrees of reshaping are to be achieved. In semi-finished products which are impregnated and consolidated to completion, these can only be achieved under great fibre extension or compression. A tube that is not yet impregnated and consolidated can be reshaped considerably better in comparison (bending angle less than 150°). In addition to the fibre elongation (elongation of the individual fibres), the thread structure (structural elongation) can be shifted. Ergo, the fibre is elongated less and thus relieved. Thus, the bending angle of 90° at low bending radii can be preformed. The cross-section at these bending points becomes highly elongate after deformation.

A robot for the bending perform process consists of a main robot that takes on the rough positioning and the handling between the process steps. This main robot carries a platform on which there are several micro multi-axis robots. Of these, two micro multi-axis robots have the task of receiving a sealing device. This consists of a sealing stamp (produced by means of injection moulding; remains in the component after the process) and a sealing unit (which is removed after the process and resupplied into the production). The sealing stamp serves as the reshaping stamp. At the start of the heating process, only the FVK tube ends are heated up and the conically running sealing stamp is introduced. As a result of the steeply running sealing stamp, the geometry of the tube ends changes relative to the outer geometry of the sealing stamp. At the same time, a UD bushing integrated into the sealing stamp can be introduced into the FVK tube ends via lateral impression stamps in order to create connection possibilities. The sealing surfaces that prevent pressure escaping are welded onto the FVK tube inside and end side. The sealing unit has the task of guiding the sealing stamp. Similarly, the sealing unit switches between different pressures. In order to introduce the pressure into the inside of the FVK tube, the sealing stamp has to have a through-guide which guides the pressure through the whole stamp.

Two pressure lines are provided to the sealing unit (with the sealing stamp). One line has a pressure of 1 bar to 6 bar. The second pressure line runs along the robot to the air pressure supply. The second line provides a pressure of up to 600 bar (this line runs inside the combined internal high-pressure reshaping injection moulding tool).

This is used in order to enable a very quick and exact increase of the pressure, which is necessary in order to compensate for the moulding pressure of the injection moulding machine.

If the supporting pressure has an effect before the injection pressure comes, the tube is pressed into the cavities and threatens to burst. If the supporting pressure acts too late, it has the result that the tube is pressed in, and the molten mass escapes into the space originating therefrom. This has the result that the overmoulded functional surfaces cannot be cleanly filled. There are integrated return valves in the connections to the sealing unit, the return valves being unlocked when the pressure line is connected. Thus, it is ensured that the pressure can nevertheless be maintained when decoupling the micro multi-axis robot.

Furthermore, micro multi-axis robots having gripping devices (gripping robots) are on the carrier plate. These are provided to receive and fix the tube along the longitudinal axis. In addition, they have the task of reshaping the tube. The grippers consist of two half shells (form grippers) that enclose the tube. Devices can be on the form grippers that enable these to be able to quickly be detached from the robot and fixed on the tool. These are, for example, small pins that have a groove into which hooks can engage. Before the injection moulding process starts, the form grippers are detached from the robot and fixed in the tool.

The cold semi-finished products are in a storage unit before the process, in which storage unit they are automatically prepared for the process. In this automatic preparation, firstly, FVK tubes roll into a pre-warming station. In the device, there are three inductors that generate an electromagnetic alternating field that considerably increases in intensity in the region of the tube ends. In this field, the nanoparticles can be reversed in polarity in the core tube and braid tube substance very quickly.

Heat emerges as a result of the re-magnetising losses, the heat making the plastic flexible. These regions can be warmed up more quickly as a result of the stronger magnetic field on the FVK tube ends. The flexurally stiff regions in the middle here stabilize the FVK tube ends.

After the softening temperature of the core tube has been reached, the sealing stamps move laterally into the tube ends, are welded and reshape the cross-section. If the sealing stamps are solidly welded in the FVK tube, a pressure of 1.5 bar is introduced inside the FVK tube. At the same time, the rest of the FVK tube is warmed up and heated to a temperature at which the core tube can be easily reshaped. Now, the micro multi-axis robots remove the flexurally soft small tubes and set off a program that at the same time reshapes all bending points and gives the tube its final course at the end (the cross-sections of the tube are only reshaped in the region of the form grippers, the rest takes place in the impregnation and reshaping station). To do so, two form grippers having robots are required at each bending point. The simultaneous reshaping has the advantage that a large amount of space is saved. If each bending point is reshaped one after the other in a CNC tube bending system, the freely pivoting end of the FVK tube swivels with large radii. Similarly, the process time is considerably reduced.

The grippers now place the small tube in an induction reshaping tool that has the negative shape of the later component. The gripping and sealing robots are now separated from the FVK tube. The sealing units and the form grippers remain on the FVK tube. By closing the tool halves (locally where necessary via sliders), the cross-sections of the tube are reshaped, and the tube receives its almost final geometry. Now, it is further heated up via induction. Coils in the tool halves generate an electromagnetic alternating field. As a result of the magnetic reversal losses in the ferritic nanoparticles, the plastic in the braid the and core tube are heated up volumetrically within a very short amount of time. At this point in time, there should be an internal pressure of 6-10 bar inside the core tube (depending on wall thickness, homogeneity of the hybrid roving, etc. . . . ). This promotes the impregnation. At the same time, this welds the outer upper layer of the core tube that is the same as or similar to plastic to the tube braid.

When the almost completely formed FVK tube is cooled to a (demoulding) temperature at which the geometry in the subsequent handling is no longer lost (e.g. c. 180° for PA), a sufficient composite adhesion is still obtained, however, in the injection moulding process (the temperature at which the hot molten mass melts the upper layer and an integral bond can emerge), it can be received again by the robot and transferred to the injection moulding machine.

When handling between the process steps, the pressure should be reduced to a minimum (around 1-1.5 bar), such that the tube still has sufficient stability, however a cross-sectional elongation is kept to a minimum. In the last process step, the component is placed into an internal high-pressure reshaping injection moulding tool (IHU-SG tool) and extrusion coated with functional elements. The cavity has to have a greater internal diameter (c. 0.1 mm) than the preceding tool since the supporting pressure has to be increased up to 600 bar, and thus an elongation of the tube takes place. After cooling to the demoulding temperature (c. 150° for a glass fibre PA composite), the robot can remove the FVK tube and directly insert the next tube which has been moulded to completion.

After the IHU-SG process, bores must be milled on the tube ends where there are UD bushings, in order to achieve the connection. In order to optimize the process time, the impregnation process has to be started in such a way that as little time as possible elapses between the end of heating and the start of the injection moulding process. It is thus sufficient that the process takes place by means of a robot. The injection moulding process requires the most time. Thus, all other processes should take place within this cycle time in order to minimize the total running time. When the robot has placed a tube into the injection moulding machine, the process chain starts afresh. The reshaping and impregnation/consolidation thus takes place in parallel to the injection moulding process. This enables the quick, volumetric heating by induction.

As part of the method suggested here, manufacturing costs can be reduced, in particular by reducing logistics, energy and investment costs. The material quality can be increased as a result of a reduction of oxidative processes by heating the various semi-finished products once. The costs are further reduced by welding integration of the stamps of the sealing device by way of functional integration. The FMV hybrid component which is produced can be recycled easily, in particular when it consists only of thermoplastics and glass fibres in a preferred embodiment. The method depicts, in particular, a scalable flexible serial process that is capable of mass production and can also be used for cross members, crash elements, torsion bars, roof mirrors and bending carriers of a lower bumper.

The invention is illustrated in greater detail below by means of the drawings.

DETAILED DESCRIPTION OF THE DRAWINGS

Figure 1:
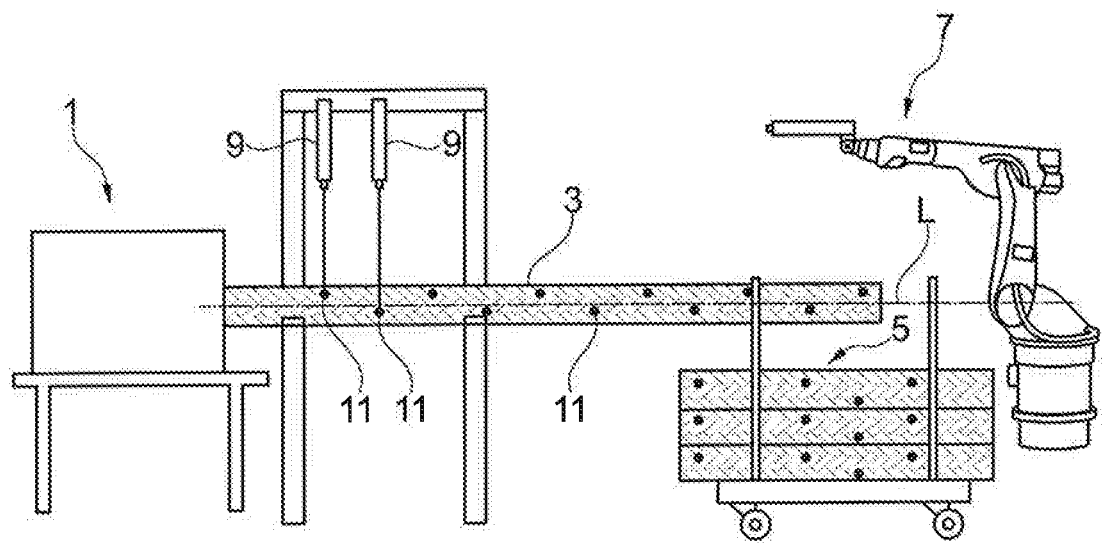
FIG. 1 is a schematic depiction of details of an embodiment of the method.

FIG. 1 shows a schematic detailed depiction of an embodiment of a method for producing an FMV hybrid component. Here, a thread pultrusion system 1 is schematically depicted here, by means of which a dry hybrid fibre thread is braided onto a lost core element, wherein a hybrid fibre braid is formed on the lost core element, and wherein a fibre core composite 3 is obtained. This fibre core composite 3 is manufactured here continuously in an endless process, wherein individual FMV hybrid semi-finished products 5 are cut from the endless fibre core composite 3 as fibre core composites, here in particular by means of a cutting laser 7. Here, the cutting laser melts 7 the ends of the FMV hybrid semi-finished products 5 at the same time and fuses these, wherein it surrounds them, in particular, such that there are no individual reinforcing fibres protruding on the end side from the FMV hybrid semi-finished products 5.

Welding points 11 of which here only some are labelled with the reference numeral 11 for the sake of better visibility, are placed by means of the welding laser 9 along a longitudinal axis L of the fibre core composite 3, which regionally fix the hybrid fibre braid on the fibre core composite 3—in particular for the purposes of preventing the hybrid fibre braid shifting relative to a core element that is not depicted during transportation.

Figure 2:
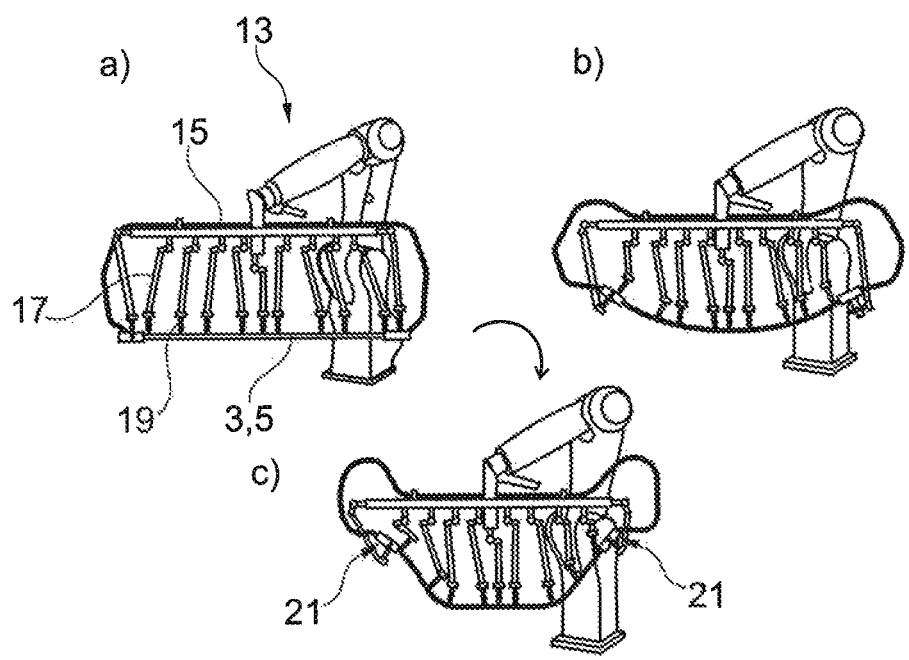
FIG. 2 is a further detailed depiction of a preferred embodiment of the method.

FIG. 2 shows a schematic depiction of a further detail of a preferred embodiment of the method. The same elements and elements with the same function are provided with the same reference numerals, so as to reference the preceding description in this respect. Here, an FMV hybrid semi-finished product 5 that, at the same time, represents a fibre core composite 3, is held by a multi-axis robot 13—as depicted with a), wherein the multi-axis robot 13 carries a platform 15 on which a plurality of micro multi-axis robots 17, of which here only one is labelled with the reference numeral 17 for the sake of better visibility, is arranged, wherein a gripper 19 is allocated to each micro multi-axis robot 17. The micro multi-axis robots 17 hold the fibre core composite 3 with their grippers 19.

In b) and c), it is depicted that the micro multi-axis robots 17 now reshape the fibre core composite by—preferably controlled or regulated—relative displacement relative to one another, in particular by bending. Here, reshaping takes place at the same time at all bending points provided for the fibre core composite 3, which saves both space and time.

In a method step not depicted the fibre core composite 3 was previously heated to a flexurally limp state in order to be able to be reshaped by the micro multi-axis robots 17.

A core tube used as the core element is placed under a supporting internal pressure, so that it does not collapse during reshaping. To do so, a sealing device 21, in particular, is provided that is explained in more detail in FIG. 3. Each sealing device 21 is preferably held by a multi-axis robot 17.

Figure 3:
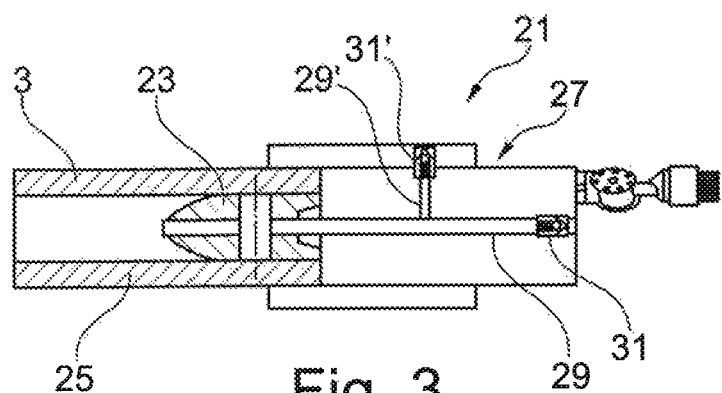
FIG. 3 is a schematic depiction of the functionality of a sealing device as part of a preferred embodiment of the method.

FIG. 3 shows a schematic detailed depiction of an embodiment of the method. Here, the sealing device 21 is depicted on an end of the fibre core composite 3. Preferably, however, the fibre core composite 3 has, in each case, the elements of the sealing device 21 depicted here on its two ends that are opposite each other when seen in the longitudinal direction of the fibre core composite 3.

The sealing device 21 has a stamp 23 that is inserted into a core tube 25 of the fibre core composite 3 on the end side. The stamp 3 preferably has at least one through bore for the passage of a fluid applying the supporting internal pressure. At the same time, the stamp 3 serves as a reshaping die when reshaping the fibre core composite 3, and it furthermore remains in the finished FMV hybrid components as the lost stamp, wherein it serves, in particular, as bushing, preferable as UD-FMV bushing.

Moreover, the sealing device 21 has a sealing unit 27 that can be tightly connected to the fibre core composite 3 and the stamp 23, however it preferably remains on a device for carrying out the method and is therefore not lost.

The sealing unit 27 has at least one bore for the passage of a fluid applying the supporting internal pressure. Here, two connections 29, 29' are here provided for pressure lines, wherein in each case return valves 31, 31' are arranged in the connections, the return valves 31, 31' serving to be able to maintain the supporting internal pressure even when the connections 29, 29' are separated from the pressure lines. A first connection 29 here serves, for example, to connect to a pressure line that is under a pressure of at least 1 bar to at most 6 bar. The second connection 29' preferably serves to connect to a pressure line which is under a pressure of 600 bar. By connecting the inside of the fibre core composite 3 to the different pressure lines—in particular in an alternating manner—different pressures can be set very quickly and simply as supporting internal pressures in the fibre core composite 3 in different stages of the method for producing the FMV hybrid component. Here, a lower pressure preferably serves to support during reshaping, wherein a higher pressure preferably serves to support in a subsequent injection moulding process in an injection moulding tool in order to be able to receive the injection pressure.

The sealing units 27 can, in particular, be provided instead of a gripper 19 or as grippers 19 on one micro multi-axis robot 17 in each case. They then serve at the same time as a bracket for the fibre core composite 3 on the multi-axis robot 13.

Figure 4:
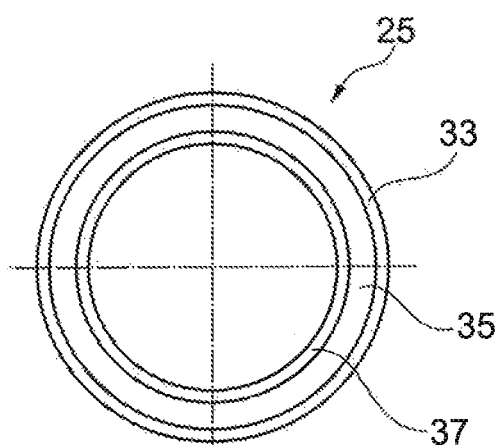
FIG. 4 is a schematic cross-sectional depiction of a core tube preferably used as part of the method.

FIG. 4 shows a schematic cross-sectional depiction of an exemplary embodiment of the core tube 25 that is preferably used as the core element. Here, it is clear that the core tube 25 in this exemplary embodiment has exactly three different layers, namely an outer layer 33, an inner layer 35, and an innermost layer 37. Here, the outer layer 35 has a plastic that is chemically similar to a matrix plastic of the hybrid fibre braid or is identical to this. The inner layer 35 has a plastic that has at least one property that is selected from a group consisting of a pressure-tight property, a fluid-tight property, and a higher glass transition temperature and/or a higher melting temperature than that of the matrix plastic of the hybrid fibre braid. The innermost layer 37 has a plastic that has at least one property selected from a group consisting of a fluid-tight property, a medium-resistant property, a slideable property, and a temperature-resistant property. In this way, different functions can be provided for the different layers, such that the core tube 25 can also take on a plurality of different functions within the fibre core composite 3 and, where necessary, within the finished FMV hybrid semi-finished product 5.

PA and/or PPA, in particular, is/are preferred as the plastic for the matrix material of the hybrid fibre braid and as the plastic for the outer layer. PA6.6, PPA or PEEK is/are preferred as the plastic for the inner layer 35. PPA, PEEK, A6.6, beam crosslinked PA, or a short glass fibre reinforced PA, in particular with short glass fibres amounting to 20%, is/are preferred as the plastic for the innermost layer. A foamed property is also possible for the innermost layer 37, the innermost layer 37 is thus preferably formed as a foamed layer.

Preferably, both the hybrid fibre braid and the core element, in particular the core tube 25, have magnetically effective particles, wherein the fibre core composite 3 is inductively warmed for reshaping and also for impregnation and consolidation.

Ferritic nanoparticles, in particular, are provided as magnetically effective particles.

Furthermore, it is preferably provided that the hybrid fibre braid has a lower concentration of magnetically effective particles than the core element, in particular the core tube 25, wherein, at the same time, the magnetically effective particles for the hybrid fibre braid have a higher Curie temperature than the magnetically effective particles for the core element, in particular the core tube 25.

Preferably, the core tube 25 has magnetically effective particles in all its layers 33, 35, 37.

Figure 5:
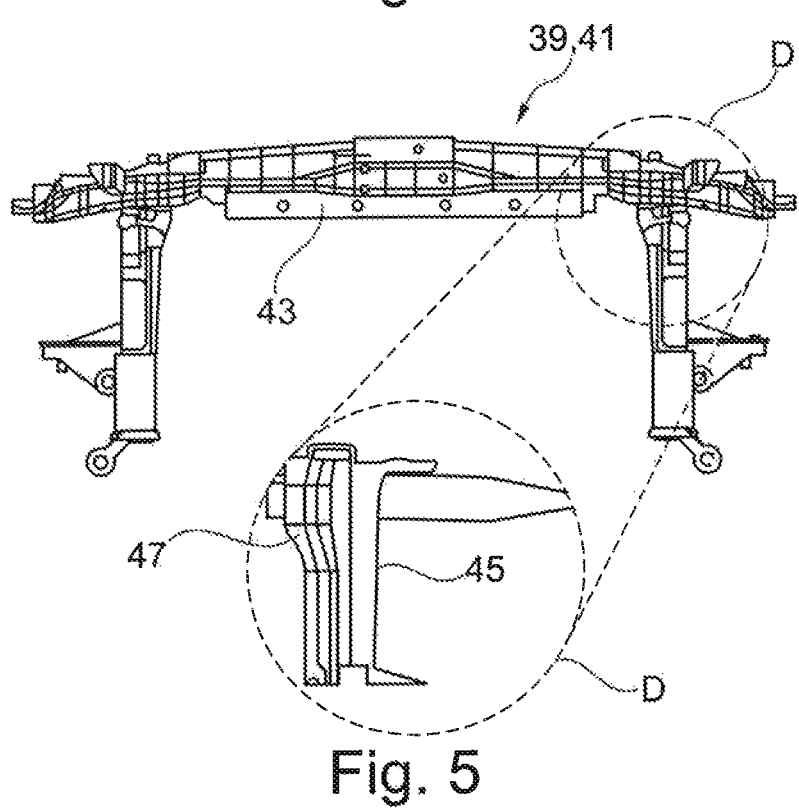
FIG. 5 is a schematic depiction of an exemplary embodiment of an FMV hybrid component.

FIG. 5 shows a schematic depiction of an exemplary embodiment of an FMV hybrid component 39 that is produced as part of an embodiment of the method described above. The FMV hybrid component 39 here is formed as a front-end carrier 41 for a motor vehicle. Here, it has a plurality of overmoulds and/or extrusion coatings 43, of which, here, only one is schematically labelled with the reference numeral 43 for the sake of better visibility. These overmoulds and/or extrusion coatings 43 are preferably provided on the FMV hybrid component in an injection moulding tool.

A Z-brace 45 of the front-end carrier 41 is depicted in a detailed view D, the Z-brace 45 being formed by a flat FMV semi-finished product 47 in the injection moulding tool being placed around the FMV hybrid component 39, wherein it is reshaped by the closing pressure of the injection moulding tool and/or by the injection pressure, and is moulded onto the FMV hybrid component 39. Preferably, here the flat FMV semi-finished product 47 that is preferably formed as an organic sheet is at least regionally extrusion coated with plastic, which further improves the connection of the FMV semi-finished product 47 to the FMV hybrid component 39.

Overall, it is shown that an FMV hybrid component 39 can be produced more reliably with low effort and, at the same time, without damage with very high degrees of reshaping by means of the method.

The invention claimed is:

1. A method for production of a fibre matrix composite (FMV) hybrid component, comprising the steps of:

braiding a dry hybrid fibre thread onto a core element, wherein a hybrid fibre braid is formed on the core element and a fibre core composite is obtained;

reshaping the fibre core composite;

impregnating and consolidating the hybrid fibre braid on the core element, wherein the core element remains in the produced FMV hybrid component and forms an integral constituent of the produced FMV hybrid component;

wherein a core tube is used as the core element which:
a) has at least one plastic; and/or
b) is subjected to pressure during the step of reshaping;

and further comprising the step of inserting a stamp into the core tube on an end side, wherein the stamp:
a) serves as part of a sealing device for applying internal pressure to the core tube; and/or
b) is used in the core tube as a reshaping die during the step of reshaping; and/or
c) remains in the FMV hybrid component as a lost stamp and serves as a bushing.

2. The method according to claim 1, wherein at least the dry hybrid fibre thread and at least the core element have magnetically effective particles, wherein the fibre core composite is inductively heated for the step of reshaping and for the steps of impregnating and consolidating.

3. The method according to claim 1, wherein welding points are placed along a longitudinal axis of the fibre core composite.

4. The method according to claim 1, wherein the FMV hybrid component:
a) is provided with at least one overmould in an injection moulding tool; and/or
b) is connected to at least one flat FMV semi-finished product.

5. An FMV hybrid component produced by the method according to claim 1, wherein the FMV hybrid component is formed as a front-end carrier for a motor vehicle.

6. A method for production of a fibre matrix composite (FMV) hybrid component, comprising the steps of:
braiding a dry hybrid fibre thread onto a core element, wherein a hybrid fibre braid is formed on the core element and a fibre core composite is obtained;
reshaping the fibre core composite; and
impregnating and consolidating the hybrid fibre braid on the core element, wherein the core element remains in the produced FMV hybrid component and forms an integral constituent of the produced FMV hybrid component;
wherein the fibre core composite is continuously produced in an endless process as an endless fibre core composite, wherein individual FMV hybrid semi-finished products are cut from the endless fibre core composite.

7. The method according to claim 6, wherein the individual FMV hybrid semi-finished products are cut from the endless fibre core composite by a laser beam.

8. A method for production of a fibre matrix composite (FMV) hybrid component, comprising the steps of:
braiding a dry hybrid fibre thread onto a core element, wherein a hybrid fibre braid is formed on the core element and a fibre core composite is obtained;
reshaping the fibre core composite; and
impregnating and consolidating the hybrid fibre braid on the core element, wherein the core element remains in the produced FMV hybrid component and forms an integral constituent of the produced FMV hybrid component;
wherein a core tube is used as the core element that has a multitude of layers, including:
a) an outer layer that has a plastic that is at least chemically similar to a matrix plastic of the hybrid fibre thread; and/or
b) an inner layer that has a plastic that has a pressure-tight property, a fluid-tight property, a higher glass transition temperature than that of the matrix plastic, and/or a higher melting temperature than that of the matrix plastic; and/or
c) an innermost layer that has a plastic that has a fluid-tight property, a medium resistant property, a slideable property, and/or a temperature-resistant property.

9. A method for production of a fibre matrix composite (FMV) hybrid component, comprising the steps of:
braiding a dry hybrid fibre thread onto a core element, wherein a hybrid fibre braid is formed on the core element and a fibre core composite is obtained;
reshaping the fibre core composite; and
impregnating and consolidating the hybrid fibre braid on the core element, wherein the core element remains in the produced FMV hybrid component and forms an integral constituent of the produced FMV hybrid component;
wherein both the dry hybrid fibre thread and the core element have magnetically effective particles, wherein, for the dry hybrid fibre thread:
a) a lower concentration of the magnetically effective particles is used than for the core element, and/or
b) magnetically effective particles having a higher Curie temperature than those used for the core element are used.

* * * * *